(12) United States Patent
Dinh-Sybeldon et al.

(10) Patent No.: US 12,232,502 B2
(45) Date of Patent: Feb. 25, 2025

(54) RIGID SHIRRED FOOD CASING ARTICLES, AND RELATED METHODS AND COMPOSITIONS

(71) Applicant: Viskase Companies, Inc., Lombard, IL (US)

(72) Inventors: Ann Dinh-Sybeldon, Woodridge, IL (US); Matthew E. Bachner, Glen Ellyn, IL (US); Owen J. McGarel, Naperville, IL (US)

(73) Assignee: Viskase Companies, Inc., Lombard, IL (US)

( * ) Notice: Subject to any disclaimer, the term of this patent is extended or adjusted under 35 U.S.C. 154(b) by 893 days.

(21) Appl. No.: 17/218,626

(22) Filed: Mar. 31, 2021

(65) Prior Publication Data

US 2021/0307342 A1   Oct. 7, 2021

Related U.S. Application Data

(60) Provisional application No. 63/002,553, filed on Mar. 31, 2020.

(51) Int. Cl.
*A22C 13/02* (2006.01)
*A22C 13/00* (2006.01)

(52) U.S. Cl.
CPC .......... *A22C 13/02* (2013.01); *A22C 13/0013* (2013.01); *A22C 2013/004* (2013.01); *A22C 2013/0043* (2013.01); *A22C 2013/0063* (2013.01)

(58) Field of Classification Search
CPC ............. A22C 13/02; A22C 13/0013; A22C 2013/004; A22C 2013/0043; A22C 2013/0063

USPC ........................................................ 426/138
See application file for complete search history.

(56) References Cited

U.S. PATENT DOCUMENTS

| | | |
|---|---|---|
| 3,898,348 A | 8/1975 | Chiu et al. |
| 3,909,882 A | 10/1975 | Winokur |
| 4,033,382 A | 7/1977 | Eichin |
| 4,585,680 A | 4/1986 | Nausedas |
| 4,649,961 A | 3/1987 | McAllister et al. |
| 4,693,280 A | 9/1987 | Beardsley |

(Continued)

FOREIGN PATENT DOCUMENTS

| | | |
|---|---|---|
| EP | 0180207 A2 | 5/1986 |
| EP | 0140184 B1 | 6/1988 |

(Continued)

OTHER PUBLICATIONS

International Search Report for International Application No. PCT/US2021/025112, mailed Jul. 8, 2021, 4 pages.

(Continued)

*Primary Examiner* — Brent T O'Hern
(74) *Attorney, Agent, or Firm* — TraskBritt

(57) ABSTRACT

Rigid shirred food casing articles (e.g., shirred sticks of casing material) include a cohesion-enhancing solution applied to at least one surface of the casing material. The cohesion-enhancing solution comprises at least one polysaccharide (e.g., dextrin) and a predominantly non-aqueous solvent (e.g., comprising propylene glycol). The coherency-enhancing solution comprises less than 50 wt. % water. Related methods and compositions are also disclosed.

20 Claims, 1 Drawing Sheet

(56) References Cited

U.S. PATENT DOCUMENTS

| | | | |
|---|---|---|---|
| 4,756,057 A | 7/1988 | Mc Allister et al. | |
| 4,818,551 A | 4/1989 | Stall et al. | |
| 4,873,748 A | 10/1989 | Evyan et al. | |
| 5,038,832 A | 8/1991 | Mahoney et al. | |
| 5,230,933 A | 7/1993 | Apfeld et al. | |
| 5,238,443 A | 8/1993 | Beardsley | |
| 7,803,437 B2 | 9/2010 | Delius et al. | |
| 2006/0057258 A1 | 3/2006 | Dinh-Sybeldon et al. | |

FOREIGN PATENT DOCUMENTS

| | | | |
|---|---|---|---|
| EP | 0559456 A1 | | 9/1993 |
| EP | 1634501 A1 | | 3/2006 |
| EP | 0692194 B2 | * | 10/2006 |
| EP | 1796478 B1 | | 10/2008 |
| WO | 98/08390 A2 | | 3/1998 |
| WO | 2017/148682 A1 | | 9/2017 |
| WO | 2018/074950 A1 | | 4/2018 |

OTHER PUBLICATIONS

International Written Opinion for International Application No. PCT/US2021/025112, mailed Jul. 8, 2021, 8 pages.
European Communication pursuant to Article 94(3) EPC for European Application No. 21720896.6, dated Aug. 17, 2023, 8 pages.
Brazilian Preliminary Office Action and Search Report for Brazilian Application No. BR112022019515-0, dated Jul. 1, 2024, 7 pages with English translation.
European Communication pursuant to Rule 114(2) EPC for European Application No. 21720896.6, dated Jul. 29, 2024, 8 pages.
European Communication pursuant to Article 94(3) EPC for European Application No. 21720896.6, dated Jun. 26, 2024, 5 pages.

* cited by examiner

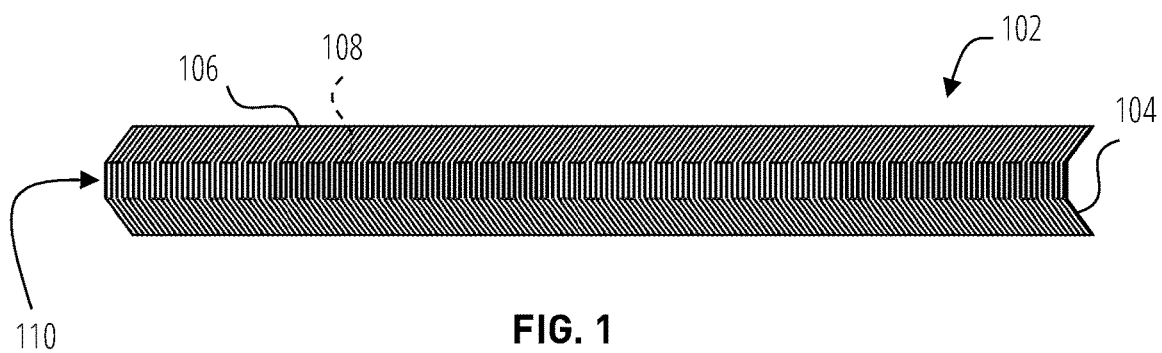
FIG. 1
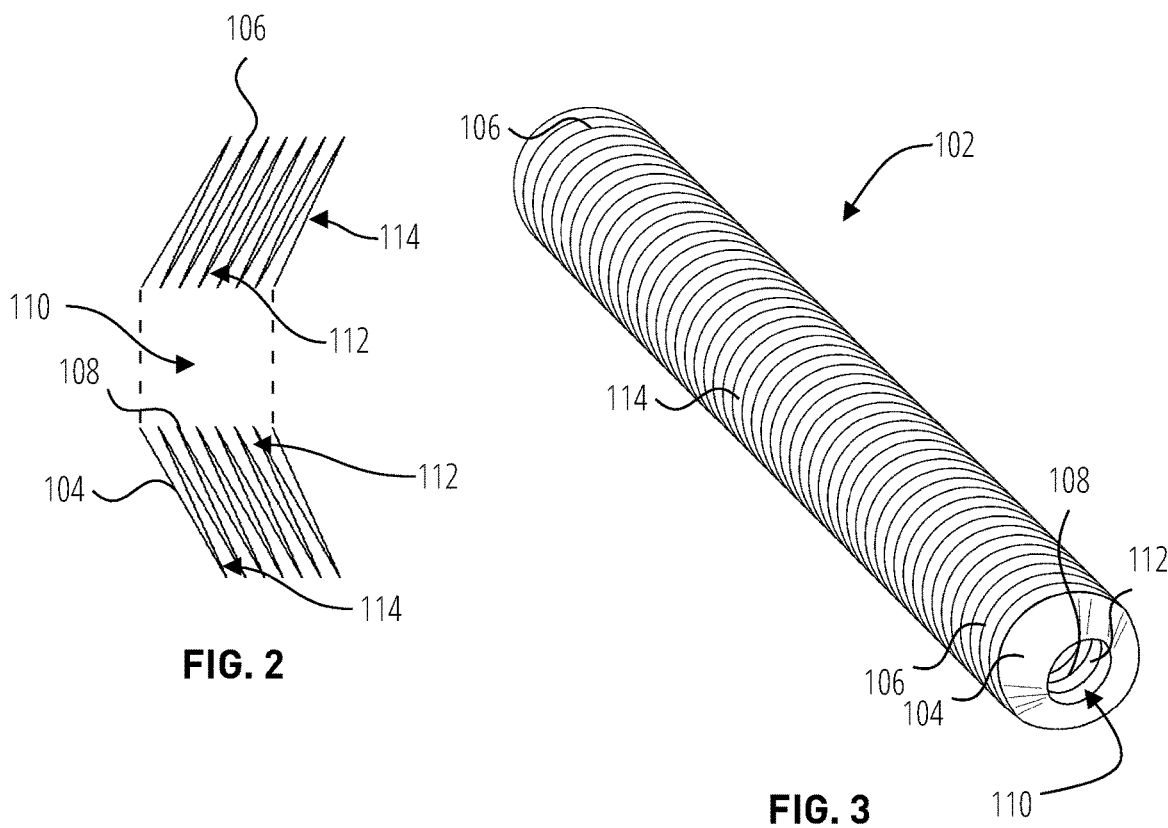
FIG. 2
FIG. 3
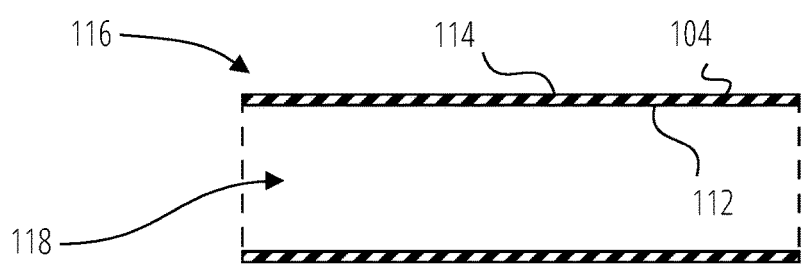
FIG. 4

RIGID SHIRRED FOOD CASING ARTICLES, AND RELATED METHODS AND COMPOSITIONS

CROSS-REFERENCE TO RELATED APPLICATION

This application claims the benefit, under 35 U.S.C. § 119(e) of U.S. Provisional Patent Application Ser. No. 63/002,553, filed Mar. 31, 2020, the disclosure of which is hereby incorporated in its entirety herein by this reference.

TECHNICAL FIELD

Embodiments of the disclosure generally relate to shirred food casing articles, such as food casings in the form of shirred "sticks." More particularly, this disclosure relates to food casings treated with a cohesion-enhancing solution to form shirred food casings exhibiting improved rigidity. This disclosure also relates to cohesion-enhancing solutions used in shirring food casings, to methods for forming the cohesion-enhancing solutions, and to methods for forming shirred food casing articles.

BACKGROUND

Food casings are films used to encase food products, such as sausage or other types of meats (e.g., hot dogs, deli meats) for processing and packaging. Food casings may be made from natural or artificial materials, may be permeable or non-permeable, and may be monolayered or multilayered.

To form food casings, the casing material is often formed as a tube or formed as a flat film and then subsequently formed into a tube. For example, flat films may be formed, and strips of desired widths may be cut, formed into tubes, and sealed closed. As another example, a thermoplastic film may be formed by extruding molten resin from an annular die and optionally stretching the tube, e.g., by expanding it with air. Multilayered films may be formed by coextruding multiple layers together or by extrusion lamination, wherein a thermoplastic layer is extruded through a slot die directly onto an adhesive layer already placed onto a non-adhesive layer or onto other plastic layers.

Food casings are often provided to a food processor in a shirred form. Shirring is a method of pleating (e.g., using a shirring mandrel) a long piece of casing material, particularly a tubular casing, into a much more compact tube called a "stick." For example, a 15-inch (38.1 cm) long shirred stick of a thermoplastic, small-bore casing may contain about 185 feet (58.4 m) of the casing when in un-pleated (e.g., "deshirred") form.

The shirred sticks may be used in automatic stuffing machines, in which the sticks are held in place and the foodstuff (e.g., sausage emulsion) is introduced under high speed and pressure into the interior of the casing material of the stick. The stuffing simultaneously deshirrs the stick (e.g., unpleating and elongating the casing) and form the encased-food product (e.g., sausages). Larger bore casings, shirred to form large-bore shirr sticks, may be used on machines for encasing processed and formed meats, hams, or other whole-muscle meats as well as various other deli-type meats. Whether small-bore or large-bore, the casing may be removed after cooking the food product, and the processed food product may be automatically sliced and packaged for sale to the ultimate consumer.

Forming sticks of shirred food casing material continues to present challenges. For example, conventional shirred sticks of plastic casing material are generally considered unsuitable for producing intrinsically stable shirred sticks. Such casing materials tend not to hold their compact, pleated, shirred stick shape; instead, they tend to elongate after shirring and removal from a shirring mandrel. Therefore, while a shirred stick may initially be formed to compact the casing material into a shirred stick length of, e.g., about 14 inches (35.6 cm), by the time a food processor uses the shirred stick on a stuffing machine, the shirred stick may have expanded to about 15 inches (38.1 cm). As the shirred stick expands, the stick may also lose some structural integrity, making the shirred stick more vulnerable to breaking, ruptures in the casing material, or loss of shape during handling. These degradations can present challenges when the shirred stick is to be moved to and used on an automatic stuffing machine. As another example, conventional shirred sticks of cellulose casings may tend to hold their pleated shape more consistently, after shirring, compared to shirred plastic casings; however, even conventional, shirred sticks of natural casings may exhibit insufficient rigidity after shirring, leading to bending, breaking, or other deformation of the shirred stick before it is used on an automatic stuffing machine.

Efforts have been made to encourage plastic casings to hold their shirred stick forms. Such efforts include heating and subjecting the casing material to compression during or after shirring to encourage as much lateral compaction of the casing material as possible. To prevent elongation of the shirred sticks, and the resulting expansion of pleats and loss of shape, conventional shirred sticks are often covered by a confining structure (such as a tubular net, film, or other covering) to hold the pleated, compact casing material in the form of the shirred stick. However, the additional means for preventing elongation adds processing steps, materials, and labor, not only in the stage of forming the shirred stick, but also in the stage of removing the confining structure to allow the shirred stick to be used on a stuffing machine. As another example, conventional casings in shirred stick form are often placed onto a supportive fixture (e.g., a rod extending through a central opening or otherwise known as a central "bore" of the shirred stick) to ensure the shirred stick maintains its structural integrity so that it can be subsequently used on a stuffing machine. Again, these additional steps and structures require additional materials, labor, and time, reducing production speed and increasing energy costs to create and use the shirred stick. Accordingly, forming shirred sticks of casing material continues to present challenges.

BRIEF SUMMARY

In some embodiments, a shirred food casing article comprises a casing material and a coherency-enhancing solution on or in the casing material. The coherency-enhancing solution comprises at least one polysaccharide and a predominantly non-aqueous solvent. The coherency-enhancing solution comprises less than 50 wt. % water.

In some embodiments, a method for forming a shirred food casing article comprises applying a coherency-enhancing solution to at least one surface of a casing material. The coherency-enhancing solution comprises at least one polysaccharide and a predominantly non-aqueous solvent. The coherency-enhancing solution comprises less than 50 wt. % water. The method also comprises shirring the casing material to form the shirred food casing article.

In some embodiments, a cohesion-enhancing solution— for a shirred casing material—comprises at least one polysaccharide and a predominantly non-aqueous solvent. The coherency-enhancing solution comprises less than 50 wt. % water.

BRIEF DESCRIPTION OF THE DRAWINGS

FIG. 1 is a side, elevational, schematic illustration of a casing material formed into a rigid shirred food casing article (e.g., a "shirred stick"), according to embodiments of the disclosure.

FIG. 2 is a side, elevational, schematic, enlarged illustration of a portion of the shirred stick of FIG. 1, in partially axially expanded form, for ease of illustration.

FIG. 3 is a front and top, perspective, schematic illustration of the shirred stick of FIG. 1, in a partially axially expanded form, for ease of illustration.

FIG. 4 is a side, elevational, cross-sectional, schematic illustration of a portion of the casing of FIG. 1 in fully axially expanded (e.g., deshirred) form.

DETAILED DESCRIPTION

Disclosed are rigid shirred food casing articles, provided in the form of intrinsically-stable, shirred sticks. As formed, the shirred sticks may not require additional processing steps to ensure sufficient rigidity and avoidance of breaking during subsequent handling, packaging, shipping, and use on automatic stuffing machinery. Once deshirred and stuffed, the treated casings also endure cook-in processes used for producing food products, such as small sausages, large sausages, or other encased meat products.

As used herein, the term "permeable," when used in reference to a casing material, means and includes a casing material that is permeable to both liquid and gaseous components, such as being permeable to the liquid components of solutions disclosed herein. A "permeable" casing material may have a moisture vapor transmission rate of greater than about 40 g·day$^{-1}$·100 in$^{-2}$·mmHg$^{-1}$ (about 0.054 mg·s$^{-1}$·m$^{-2}$·Pa$^{-1}$).

As used herein, the term "semi-permeable," when used in reference to a casing material, means and includes a casing material that is partially permeable to liquid and/or gaseous components, such as being partially permeable to the liquid components of solutions disclosed herein. A "semi-permeable" casing material may have a moisture vapor transmission rate between about 0.1 g·day$^{-1}$·100 in$^{-2}$·mmHg$^{-1}$ (about 134 mg·s$^{-1}$·m$^{-2}$·Pa$^{-1}$) and about 0.40 g·day$^{-1}$·in$^{-2}$·mmHg$^{-1}$ (about 0.054 mg·s$^{-1}$·m$^{-2}$·Pa$^{-1}$).

As used herein, the term "non-permeable," when used in reference to a casing material, means and includes a casing material that is not permeable to liquid or gaseous components, such as not being permeable to the liquid components of solutions disclosed herein. A "non-permeable" casing material may have a moisture vapor transmission rate of less than about 0.1 g·day$^{-1}$·100 in$^{-2}$·mmHg$^{-1}$ (about 134 ng·s$^{-1}$·m$^{-2}$·Pa$^{-1}$).

As used herein, a "moisture vapor transmission rate" may be measured according to a standard moisture (e.g., water) transmission rate testing method, such as standard ASTM E398-13 for a standard test method for water vapor transmission rate of sheet materials using dynamic relative humidity measurement, ASTM F1249-13 for a standard test method for water vapor transmission rate through plastic film and sheeting using a modulated infrared sensor, ASTM F3299-18 for a standard test method for water vapor transmission rate through plastic film and sheeting using an electrolytic detection sensor (Coulometric P205 Sensor), and/or ASTM E96/E96M-16 for standard test methods for water vapor transmission of materials.

As used herein, the terms "about" and "approximately," when either is used in reference to a numerical value for a particular parameter, are inclusive of the numerical value and a degree of variance from the numerical value that one of ordinary skill in the art would understand is within acceptable tolerances for the particular parameter. For example, "about" or "approximately," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the terms "comprises," "comprising," "includes," and/or "including" specify the presence of stated components, chemicals, ingredients, and/or materials, but do not preclude the presence or addition of one or more other components, chemicals, ingredients, and/or materials.

As used herein, "and/or" includes any and all combinations of one or more of the associated listed items.

As used herein, the singular forms "a," "an," and "the" are intended to include the plural forms as well, unless the context clearly indicates otherwise.

As used herein, the terms "formulated" and "formula" mean and refer to a composition of referenced components, chemicals, or ingredients so as to facilitate a referenced characteristic, property, or effect of the referenced composition in a predetermined way.

As used herein, the terms "configured" and "configuration" mean and refer to a size, shape, material composition, orientation, and arrangement of a referenced material, structure, assembly, or apparatus so as to facilitate a referenced operation or property of the referenced material, structure, assembly, or apparatus in a predetermined way.

As used herein, the terms "weight percent," "weight percentage," and "wt. %" each refers to the percent, by weight, of the weight of the cohesion-enhancing solution, unless otherwise indicated.

FIG. 1 schematically illustrates a shirred stick 102 formed of a food casing material 104 that has been treated with a cohesion-enhancing solution. The cohesion-enhancing solution and the treatment of the casing material 104 with the cohesion-enhancing solution enables the shirred stick 102 to exhibit a sufficiently high rigidity to enable handling of the treated casing material 104 without breakage, and even without an external support structure or constraining article, in at least some embodiments. The rigidity of the shirred stick 102 is also not so high as to inhibit subsequent deshirring of the casing material 104.

In some embodiments, the rigidity (e.g., coherency) exhibited by the shirred stick 102, after shirring (e.g., immediately after shirring and/or within one day of shirring) and before deshirring, is such as to be able to withstand a bending moment, under a three-point load, of between about 0.5 lb-in (about 0.056 N-m) to about 15 lb-in (about 1.7 N-m). For example, the rigidity of the shirred stick 102 may be between about 2 lb-in (about 0.23 N-m) and about 10 lb-in (about 1.1 N-m), such as a rigidity above about 2 lb-in (about 0.23 N-m).

The rigidity (e.g., coherency) of the shirred stick 102 may be determined by measuring the bending moment (e.g., in lb-in, in N-m) at the breaking of the shirred stick under a three-point load. The shirred stick is cradled on two support brackets, each V-notched, secured on a base plate and spaced apart a distance D that is 0.5 in (1.27 cm) to 2.5 in (6.35 cm) less than the length of the shirred stick being tested. A pressure member—having V-notched struts spaced apart a distance of D less 4 in (D minus 10.16 cm)—is centrally lowered onto the top of the shirred stick. The downward pressure is provided by a crosshead from an ESM 301 Motorized Test Stand and measured using a model M3-10 Gauge. Before taking any measurements, the testing equipment is calibrated (e.g., according to ASTM E74-18e01). The downward speed of the pressure member is 7.5 in/min (0.32 cm/s). The force is increasingly applied until the shirred stick breaks. The force reading P (e.g., in lb, in N) is noted. The bending moment (e.g., in lb-in, in N-m) at break on the apparatus is equal to P/2×2 in (P/2×5.08 cm). Thus, the force reading P can be converted to the bending moment (e.g., in lb-in, in N-m) to break the shirred stick. Using such a rigidity measuring technique, the shirred sticks 102 of at least some embodiments of the disclosure may exhibit a rigidity (e.g., coherency) of at least about 1.0 lb-in (at least about 0.11 N-m), such as a rigidity (e.g., coherency) of at least about 2.5 lb-in (0.28 N-m).

As used herein, the "deshirr force" is the amount of force required to separate the pleats of the casing at high speed. An acceptable deshirr force value, for deshirring the casing without breaking or rupturing of the casing material 104, may be a force of up to about 0.65 lb (2.9 N)(e.g., at a constant deshirring speed of about 12 in/mm (0.51 cm/s)).

The deshirring force of the shirred stick 102 (e.g., die force required to deshirr the shirred stick 102 in the direction in which it would be stuffed) may be determined by using an apparatus consisting of a MARK-10 ESM 301 motorized test stand with associated jaws and a series 5-COF force gauge capable of measuring data in an average mode with a range of measuring between zero pounds to one pounds in 0.01 lb increments. Using this equipment, the shirred stick is pulled and deshirred at a constant speed of 12 in/min (0.51 cm/s). Before taking any measurements, the testing equipment may be calibrated according to ASTN E74-18e01.

Using the aforementioned apparatus, the test procedure for determining the deshirring force comprises or consists of the following steps. First, from the selected shirred stick, samples of approximately 2 inches (5.08 cm) of shirred length are removed from the open end, the middle, and the closed end of the shirred stick. Second, the end of each sample is deshirred by hand approximately 1 inch (2.54 cm). Tape is wrapped around the cone portion of the stick sample to ensure that the casing will not deshirr at the cone position. Third, the deshirred portion of the stick sample is placed in the upper grip (e.g., upper jaw) of the aforementioned MARK-10, and the taped, deshirred portion of the other end of the stick sample is placed in the lower grip (e.g., lower jaw) of the MARK-10. Fourth, the MARK-10 is initiated to separate the grips (e.g., jaws) at 12 in/min (0.51 cm/s), and the force—using the average mode—to separate the grips (e.g., jaws) is recorded. Using the deshirr force test, the shirred sticks 102 of at least some embodiments of the disclosure may exhibit a deshirring force of less than about 0.65 lb (less than about 2.9 N), e.g., less than about 0.55 lb (less than about 2.4N).

The casing material 104 may comprise a permeable, semi-permeable, and/or non-permeable casing material in one layer (e.g., in embodiments in which the casing material 104 is a monolayer casing) or more layers (e.g., in embodiments in which the casing material 104 is a multilayer casing). The casing material 104 may be a plastic-based casing (e.g., a thermoplastic casing (e.g., a casing comprising a thermoplastic elastomer (TPE)), a casing comprising polyvinyl alcohol (PVOH), a nylon-based casing (e.g., a casing comprising blends of nylon with hydrophilic components), or combinations of any of the foregoing), a cellulose-based casing (e.g., a casing formed from regenerated cellulose), or a combination thereof (e.g., with one or more layers of cellulose casing material and one or more additional layers of plastic casing material). In some embodiments, the casing material 104 also includes one or more additives (e.g., colorants, antiblock (AB) agents, polyamides (PA)).

To enhance the cohesion exhibited by the casing material 104, the casing material 104 is treated with a cohesion-enhancing solution prior to or during shirring for forming the shirred stick 102. The cohesion-enhancing solution comprises at least one polysaccharide. The polysaccharide(s) may comprise, consist essentially of, or consist of one or more starches (e.g., rice starch (e.g., waxy rice starch), potato starch (e.g., modified potato starch), corn starch), such as a modified starch (e.g., dextrin, which may be otherwise referred to as a hydrolyzed starch), amylose, amylopectin, glycogen, methyl cellulose, ethyl cellulose, hydroxypropyl methyl cellulose, hydroxyethyl cellulose, or combinations of any of the foregoing. In some embodiments, the polysaccharide of the cohesion-enhancing solution comprises, consists essentially of, or consists of dextrin. The dextrin may be derived from one or more of tapioca, corn, rice, wheat, potatoes, and/or another source.

The cohesion-enhancing solution further comprises at least one solvent in which the polysaccharide is dissolved. In some embodiments, the at least one solvent may comprise, predominantly (e.g., at least 50 wt. % of the solvent) at least one non-aqueous (e.g., not water) solvent, such as one or more of propylene glycol, glycerin, and/or triglyceride(s) (e.g., medium chain triglycerides), or combinations of any of the foregoing. The propylene glycol, or other non-aqueous solvent(s), may not substantially soften or weaken the casing material 104 and may not negatively impact additive polymers that may be included in the casing material 104, such as in embodiments in which the casing material 104 comprises, consists essentially of, or consists of a polymer-based (e.g., plastic) casing material. In some embodiments, the solvent may be at least 50 wt. % non-aqueous solvent(s) (e.g., at least 50 wt. % propylene glycol), e.g., at least about 75 wt. % non-aqueous solvent(s)(e.g., at least about 75 wt. % propylene glycol). The cohesion-enhancing solution may also comprise at least 50 wt. % non-aqueous solvent (e.g., at least 50 wt. % propylene glycol, such as at least about 75 wt. % propylene glycol).

Water may be excluded from the solvent and the solution, such that the solvent may consist of the non-aqueous solvent(s)(e.g., may consist substantially of the propylene glycol). In other embodiments, water may be included in the solvent, and therefore in the solution, in low amounts, e.g., at less than about 50 wt. % of the solvent, and thus less than about 49 wt. % of the solution. Some such embodiments may be those in which the casing material 104 of the shirred stick 102 comprises, consists essentially of, or consist of a plastic permeable casing material or a semi-permeable nylon-based casing material.

The amount of water within the solvent may be selected to tailor the coherency of the casing material 104 and the rigidity exhibited by the shirred stick 102. For example, the greater the amount of water within the solvent, the lesser the coherency of the casing material 104 and the lesser the rigidity of the shirred stick 102. The maximum amount of water, by weight percentage of the solvent and of the solution, may be further tailored according to the amount of moisture (e.g., water) within the casing material 104 itself as well as upon the amount of the cohesion-enhancing solution, or other solutions (e.g., solutions comprising flavorant(s), colorant(s), or the like), that are to be loaded onto or in the casing material 104. In some embodiments, the resulting treated casing material 104 in the form of the shirred stick 102 may have a moisture (i.e., water) content of less than about 10 wt. % of the casing material 104, e.g., less than about 5 wt. %.

In addition to the at least one polysaccharide and the solvent, the cohesion-enhancing solution may also comprise one or more lubricant(s)(e.g., mineral oil), one or more surfactants (e.g., a polyethylene sorbitol ester), one or more preservatives, one or more antioxidants, and/or one or more antimicrobial agents. In some embodiments comprising the lubricant(s) in the solution, the lubricant may be added separately to the casing material 104 from the other components of the solution. In some embodiments, the cohesion-enhancing solution comprises, consists essentially of, or consists of the one or more polysaccharides (e.g., dextrin), the solvent that is predominantly non-aqueous (e.g., propylene glycol), a mineral oil lubricant, and a polyethylene sorbitol ester surfactant.

In some embodiments, the above-described cohesion-enhancing solution may be further diluted, e.g., with additional non-aqueous solvent and/or with water prior to application of the cohesion-enhancing solution on the casing material 104. In such embodiments, the cohesion-enhancing solution may nonetheless comprise at least 50 wt. % non-aqueous solvent (e.g., propylene glycol), up to about 99 wt. % non-aqueous solvent (e.g., propylene glycol), and less than 50 wt. % water, e.g., less than about 20 wt. % water, e.g., less than about 10 wt. % water, e.g., less than 5 wt. % water at the time the cohesion-enhancing solution is applied to the casing material 104.

The cohesion-enhancing solution may be formulated to exhibit a low viscosity (e.g., about 200 cP or less) prior to (e.g., immediately prior to) or at the time of application of the solution on the casing material 104. The solution is also formulated to be stable (e.g., not undergoing substantial chemical changes) over a significant time period, such as over a period of at least about twenty-four hours, at least about forty-eight hours, at least about three days, at least about one week, at least about three weeks, or a month or more.

The cohesion-enhancing solution may be prepared by forming a homogenous solution of the various components, including the at least one polysaccharide and the at least one solvent. During and/or after the combining, the solution may be mechanically agitated, e.g., stirred (e.g., mixed at high shear). The at least one polysaccharide may be dissolved in the at least one solvent (e.g., the non-aqueous solvent and, if present, the water), e.g., at room temperature (e.g., at less than about 30° C., such as at less than about 28° C., e.g., at about 25° C.).

Once the cohesion-enhancing solution has been prepared, the solution is applied to the casing material 104, either with or without additional dilution as discussed above, before or during shirring of the casing material 104 to form the shirred stick 102. The casing material 104 may be shirred upon a shirred mandrel, causing pleats (e.g., outer pleats 106 and inner pleats 108) to form in the casing material 104, leaving a central opening 110 (e.g., a central "bore") along the axial length of the shirred stick 102. The pleats may be angled, relative to the central opening 110 (e.g., relative to the axis of the shirred stick 102), such that one end of the shirred stick 102 (e.g., the end adjacent arrow "110") defines a "cone" shape.

FIG. 2 illustrates a portion of the slurred stick 102 of FIG. 1, though illustrated with the pleats (e.g., the outer pleats 106 and the inner pleats 108) in a somewhat axially expanded form, for ease of illustration. Notably, in the shirred stick 102—and due to the pleating of the casing material 104—opposing portions of an inner surface 112 of the casing material 104 physically contact one another adjacent each of the inner pleats 108, while opposing portions of an outer surface 114 physically contact one another adjacent each of the outer pleats 106. The cohesion-enhancing solution promotes the cohesive nature of the casing material 104, thereby enabling stronger adhesion between opposing portions of the inner surface 112 (e.g., in embodiments in which the cohesion-enhancing solution is applied to the inner surface 112, as discussed further below) and/or the outer surface 114 (e.g., in embodiments in which the cohesion-enhancing solution is applied to the outer surface 114, as discussed further below). The increased adhesion of opposing portions of the casing material 104 surfaces (e.g., either or both of the inner surface 112 and the outer surface 114) provides the shirred stick 102 with the aforementioned increased rigidity.

FIG. 3 also illustrates the shirred stick 102 of FIG. 1, through illustrated with the pleats (e.g., the outer pleats 106 and the inner pleats 108) in a somewhat-expanded form, for ease of illustration.

The cohesion-enhancing solution may be applied (e.g., at room temperature, such as at a solution temperature of about 25° C.) to the inner surface 112, to the outer surface 114, or to both the inner surface 112 and the outer surface 114. The application may be carried out before and/or during shirring to form the shirred stick 102 (FIG. 1). Techniques for applying a solution to casing material 104 may include, for example, and without limitation spraying, slugging, rolling, dip application, or the like, to either or both of the inner surface 112 and the outer surface 114. The same or a different technique may be used to apply the cohesion-enhancing solution to the inner surface 112 and to the outer surface 114, respectively, in embodiments in which both the inner surface 112 and the outer surface 114 are treated with the solution.

In embodiments in which the cohesion-enhancing solution is applied to both the inner surface 112 and the outer surface 114 of the casing material 104, the cohesion-enhancing solution applied to the inner surface 112 may have the same composition or a different composition than the composition of the cohesion-enhancing solution applied to the outer surface 114. Nonetheless, the composition of the cohesion-enhancing solution for the inner surface 112 and the composition of the cohesion-enhancing solution for the outer surface 114 may be within the compositions described above.

In the formed, shirred stick 102, the cohesion-enhancing solution may compose up to about 35 wt. % of the shirred stick 102. Accordingly, in the shirred stick 102, with the solution-treated casing material 104, the shirred stick 102 may comprise about 0.7 wt. % to about 3.5 wt. % polysaccharide(s) (e.g., dextrin).

In the shirred stick 102, the cohesion-enhancing solution may be impregnated within, and distributed throughout, the casing material 104, e.g., if the casing material 104 is a permeable material; impregnated within, and distributed throughout, a portion of the casing material 104, e.g., if the casing material 104 is a semipermeable material; and/or adsorbed or otherwise present on the surface(s)(e.g., the inner surface 112, the outer surface 114) of the casing material 104 on which the cohesion-enhancing solution was applied, e.g., if the casing material 104 is semipermeable or non-permeable.

Due to treatment of the casing material 104 (FIG. 1) with the cohesion-enhancing solution, the casing material 104 may not tend to expand (e.g., along the axial direction), after shirring, in a manner that would leave visible gaps (e.g., gaps greater than 2 mm) between opposing surfaces within each pleat (e.g., the outer pleats 106, the inner pleats 108). The casing material 104 may be able to hold its shirred stick 102 form even without having to place the shirred stick 102 on an external fixture (e.g., a rod within the central opening 110) after shirring, even without heating and/or axially compressing the casing material 104 during or after the shirring, and even without having to apply a constraining article (e.g., a netting, a film, or other wrapping) around the shirred stick 102 to confine the casing material 104 to the condensed, pleated, shirred stick 102 form.

Moreover, because of the enhanced rigidity and improved cohesion, the length of the shirred stick 102 upon completion of the shirring (e.g., before being removed from the shirring mandrel) may be approximately the same length of the shirred stick 102 after removal from the shirring machinery (e.g., the shirring mandrel) and during storage and transportation of the shirred stick 102. Therefore, if a food processor is to use the shirred stick 102 to form encased food products, e.g., on an automatic stuffing machine that can accommodate a stick of a maximum length of 15 inches (38.1 cm), the shirred stick 102 may be formed to exhibit about the maximum length of 15 inches (38.1 cm) on the shirring mandrel. Thus, a maximum effective length of the casing material 104 may be formed into the shirred stick 102. As used herein, the maximum "effective length" of the casing material 104 means and includes the length of the casing material 104 once deshirred and unpleated, such as in the portion illustrated in FIG. 4. That is, as illustrated in FIG. 4, once the casing material 104 (FIG. 2) has been deshirred, e.g., on an automatic stuffing machine, the pleats are removed due to axial expansion of the casing material 104 (e.g., during high-speed stuffing), forming a casing 116 in which a food product (e.g., processed meat) is receivable within an opening 118 defined by the inner surface 112 of the casing 116.

In contrast, conventional casing material of conventional shirred sticks tend to extend axially after shirring and before deshirring, limiting the effective length of a casing material that may be formed into a shirred stick. For a hypothetical example, if a conventional casing material shirred to a length of 14 inches (35.6 cm) tends to expand to a length of 15 inches (38.1 cm) after being removed from a shirring mandrel, then only a maximum of 14 inches (35.6 cm) of shirred casing material may be formed for the shirred stick to be usable on the automatic stuffing machine that has a limit of a 15-inch (38.1-cm) shirred stick. If, e.g., the conventional casing material may be shirred to include about 9 feet (2.74 m) of effective length of casing material per 1 inch (2.54 cm) of shirred stick length, then the loss of the 1 inch (2.54 cm) of shirred stick length due to the after-shirring axial expansion from 14 inches (35.6 cm) to 15 inches (38.1 cm) means the conventional shirred stick has only about 126 ft. (38.4 m) of effective length of casing material, rather than 135 ft. (41.1 m) of effective length of casing material if the shirred stick could have been formed to the maximum 15 inches (38.1 cm) without concern of axial expansion. On the other hand, by embodiments of this disclosure, the cohesion-enhancing solution enables formation of the casing material 104 in the shirred stick 102 with enhanced cohesion and rigidity, without axial growth subsequent to shirring, such that the shirred stick 102 may be formed to include a greater effective length of the casing material 104 than may otherwise have been possible without the cohesion-enhancement solution application. For example, the shirred stick 102 may include an effective length of the casing material 104 that is up to about 20% greater than the effective length achievable if the casing material 104 had not been treated with the cohesion-enhancing solution. In some embodiments, the shirred stick 102 may include an effective length of the casing material 104 of more than 140 ft. (42.7 m). These longer effective lengths per shirred stick length enable improved operational efficiencies by the food processor who uses the shirred sticks 102 on automatic stuffing machines.

Still further, due to the enhanced coherency of the casing material 104 and the rigidity of the shirred stick 102, enabled by the cohesion-enhancing solution, the shirred stick 102 may be formed to a greater length without breaking or losing shape (e.g., bending)—even without inclusion of a support structure within the central opening 110 of the shirred stick 102—than may have otherwise been achievable without the application of the cohesion-enhancement solution.

EXAMPLES

In the following examples, a cohesion-enhancing solution (otherwise referred to as a "shirring solution") containing dextrin in fibrous or other forms was applied to the outside of a casing. The dextrin provided adhesion between the pleats of the casing, which improved the rigidity of the casing in the shirred stick, e.g., when the amount of the solution added was not too large. Specifically, the coherency-enhancing solution included, as the polysaccharide (e.g., dextrin) thereof, a tapioca fiber.

With reference to TABLE I, below, the percentages listed are weight percentages of the coherency-enhancing solution. The Tapioca Fiber (e.g., dextrin) serves as the at least one polysaccharide. The TWEEN 80® is a polyethylene sorbitol ester surfactant available from Croda Americas, Inc. The mineral oil was also injected into the coherency-enhancing solution and was applied to the casing, and its listed weight percentage is its weight percentage of the casing material.

TABLE I

| | Solutions Produced | | |
| --- | --- | --- | --- |
| Material | Sol1 wt. % | Sol2 wt. % | Sol3 wt. % |
| Tapioca Fiber | 5 | 5 | 10 |
| TWEEN 80 ® | 0 | 0.3 | 0 |
| Propylene Glycol | 90 | 89.7 | 85 |
| Water | 5 | 5 | 5 |
| Totals | 100 | 100 | 100 |
| Mineral Oil injected (mg/100 in$^2$) (mg/645 cm$^2$) | 0 | 30 | 0 |

Example 1: Use of Sol1, Sol2, and Sol3 on Semi-Permeable Casings

The solutions were first tested on multilayer, semi-permeable casings with the following casing formulation.

material, which resulted in shirred sticks with poor rigidity (e.g., 0.40 lb-in or less (0.045 N-m or less)) fourteen days after shirring. This example demonstrates that high loadings of shirring solution, even those that are primarily non-aqueous, prevent adhesion between the pleats of the shirred casings.

TABLE II

| Description | Color | Shirring SRR | Outside Solution | Inside Solution | Outside Solution (g/m$^2$) | Inside Solution (g/m$^2$) | Total Solution (g/m$^2$) | Stick Length (mm) | Horn Fit (mm) | 14 Day Aged Results Coherency (N-m) | Deshirr (N) |
|---|---|---|---|---|---|---|---|---|---|---|---|
| Casing B 20 × 84 Sol1/Sol2 | CLR | 16129 | Sol1 | Sol2 | 3.5-4.3 | 3.2-3.8 | 6.7-8.1 | 283 | 11.7 | 0.05 | 0.13 |
| Casing B 20 × 84 Sol1/Sol2 | CLR | 16129 | Sol1 | Sol2 | 3.5-4.3 | 3.2-3.8 | 6.7-8.1 | 279 | 11.2 | 0.05 | 0.13 |
| Casing B 20 × 84 Sol1/Sol2 | CLR | 16129 | Sol1 | Sol2 | 3.5-4.3 | 3.2-3.8 | 6.7-8.1 | 283 | 11.7 | 0.03 | 0.18 |
| Casing B 20 × 84 Sol1/Sol2 | CLR | 16129 | Sol1 | Sol2 | 3.5-4.3 | 3.2-3.8 | 6.7-8.1 | 283 | 11.7 | 0.05 | 0.18 |

CASING A

| Layer | Material | Percentage (wt. % of layer) |
|---|---|---|
| Outer | Nylon 6 | 92 to 96 |
|  | Nylon 6I/6T | 4 to 8 |
| Core | Nylon 6 | 92 to 96 |
|  | Nylon 6I/6T | 4 to 8 |
| Inner | Nylon 6 | 62 to 72 |
|  | TPE | 25 to 35 |
|  | AB PA | 2 to 4 |

The applications of Sol1, Sol2, and Sol3 each resulted in rigidities of the shirred sticks of 2 lb-in (0.23 N-m) when tested fourteen days after shirring. All of the shirred sticks could be readily handled without breaking. No fixture was used to improve rigidity.

Example 2: Permeable Casings Shirred at High Loadings of Coherency-Enhancing Solution Monolayer casings with the following formulation were shirred using applications of solutions Sol1 and Sol2. No fixture was used to improve rigidity.

CASING B

| Material | Percentage (wt. % of casing) |
|---|---|
| Nylon 6, 66 | 67 to 81 |
| PVOH | 8 to 12 |
| TPE | 8 to 12 |
| AB PA | 2 to 4 |

The casings were shirred, with application of the Sol1 solution on the outside of the casing material and with application of the Sol2 solution on the inside of the casing

Example 3: Permeable Casing Shirred with Lower Loadings of Coherency-Enhancing Solution Casings with similar formulations to those of Example 2 were tested except in multilayer form.

CASING C

| Layer | Material | Percentage (wt. % of layer) |
|---|---|---|
| Outer | Nylon 6, 66 | 76 to 84 |
|  | TPE | 8 to 12 |
|  | PVOH | 8 to 12 |
|  | Antiblock Concentrate |  |
| Core | Nylon 6, 66 | 76 to 84 |
|  | TPE | 8 to 12 |
|  | PVOH | 8 to 12 |
| Inner | Nylon 6, 66 | 74 to 81 |
|  | TPE | 8 to 12 |
|  | PVOH | 8 to 12 |
|  | Antiblock Concentrate | 2 to 4 |

CASING D

| Layer | Material | Percentage (wt. % of layer) |
|---|---|---|
| Outer | Nylon 6, 66 | 71 to 79 |
|  | TPE | 8 to 12 |
|  | PVOH | 8 to 12 |
|  | Nylon 6,6/6,10 | 2 to 4 |
|  | Colorant Masterbatch | 1.8 to 2.4 |
| Core | Nylon 6, 66 | 71 to 79 |
|  | TPE | 8 to 12 |
|  | PVOH | 8 to 12 |
|  | Nylon 6, 6/6, 10 | 2 to 4 |
|  | Colorant Masterbatch | 1.8 to 2.3 |
| Inner | Nylon 6, 66 | 68 to 76 |
|  | TPE | 8 to 12 |
|  | PVOH | 8 to 12 |
|  | Nylon 6, 6/6, 10 | 2 to 4 |
|  | Colorant Masterbatch | 1.8 to 2.3 |
|  | Antiblock Concentrate | 2 to 4 |

The same casings as in Example 2 were shirred with lower loadings of cohesion-enhancing solution. All the resulting shirred sticks could be handled without issue. The rigidity of the shirred sticks for both clear and colored casings was measured to be 1.9 lb-in (0.21 N-m), or greater, thirty days (about one month) after shirring. Therefore, the dextrin of the solution was effective in improving coherency and rigidity if the amount of solution added to the outside and the inside of the casing was not excessive. A total solution loading of 303 mg of solution per 100 in$^2$ (per 645 cm$^2$) of surface area of the casing material (in expanded, deshirred form) produced good stick properties and acceptable coherency and rigidity. The deshirr values of the casing were also low, which is advantageous because high deshirr values can result in breaking of the casing material during stuffing.

TABLE III

| | | | | | Outside | Inside | Total | Stick | Horn | | |
| | | Shirring | Outside | Inside | Solution | Solution | Solution | Length | Fit | Coherency | Deshirr |
| Description | Color | SRR | Solution | Solution | (g/m$^2$) | (g/m$^2$) | (g/m$^2$) | (mm) | (mm) | (N-m) | (N) |
|---|---|---|---|---|---|---|---|---|---|---|---|
| | | | | | | | | 14 Day Aged Results | | | |
| Casing C 19 × 84 CLR | CLR | 15850-1 | Sol1 | Sol1 | 2.6-3.2 | 1.6-1.9 | 4.2-5.2 | 273 | 11.6 | 0.21 | 0.13 |
| Casing D 19 × 84 WED | WED | 15850-5 | Sol1 | Sol1 | 2.6-3.2 | 1.6-1.9 | 4.2-5.2 | 273 | 11.7 | 0.21 | 0.13 |
| Casing C 19 × 84 CLR | CLR | 15850-1 | Sol2 | Sol2 | 2.6-3.2 | 1.6-1.9 | 4.2-5.2 | 269 | 11.4 | 0.27 | 0.13 |
| Casing D 19 × 84 WED | WED | 15850-5 | Sol2 | Sol2 | 2.6-3.2 | 1.6-1.9 | 4.2-5.2 | 274 | 11.4 | 0.21 | 0.12 |

Example 4: Aged Coherency

With reference to TABLE IV below, the coherency of a shirred stick of casings with Sol1 or Sol3 applied to both the inside and outside of the casing material was measured over various periods of time (one week, about two months, about six months, and one year) and compared with measured coherency of shirred sticks at these same time periods with solutions lacking at least one polysaccharide (e.g., a solution of propylene glycol and water, a solution of propylene glycol only).

| CASING E | |
|---|---|
| Material | Percentage (wt. % of casing) |
| Nylon 6, 66 | 68 to 80 |
| PVOH | 8 to 12 |
| TPE | 8 to 12 |
| Antiblock Concentrate | 2 to 4 |
| Colorant Masterbatch | 2 to 4 |

TABLE IV

| | | | | | Outside | Inside | Total | Aged Coherency Results | | | |
| | | | | | | | | 7 | 60 | 180 | 365 |
| | | Shirring | Outside | Inside | Solution | Solution | Solution | Day | Day | Day | Day |
| Description | Color | SRR | Solution | Solution | (g/m$^2$) | (g/m$^2$) | (g/m$^2$) | (N-m) | (N-m) | (N-m) | (N-m) |
|---|---|---|---|---|---|---|---|---|---|---|---|
| Casing E 20 × 85 LTW | LTW | 16276-1 | Sol1 | Sol1 | 2.6-3.2 | 1.6-1.9 | 4.2-5.2 | 0.28 | 0.25 | 0.12 | 0.18 |
| Casing E 20 × 85 LTW | LTW | 16276-2 | 90% PG 10% H$_2$O | 90% PG 10% H$_2$O | 2.6-3.2 | 1.6-1.9 | 4.2-5.2 | 0.14 | 0.22 | 0.09 | 0.00 |
| Casing E 20 × 85 LTW | LTW | 16276-6 | Sol3 | Sol3 | 2.6-3.2 | 1.6-1.9 | 4.2-5.2 | 0.33 | 0.22 | 0.22 | 0.32 |

TABLE IV-continued

| Description | Color | Shirring SRR | Outside Solution | Inside Solution | Outside Solution (g/m²) | Inside Solution (g/m²) | Total Solution (g/m²) | Aged Coherency Results | | | |
|---|---|---|---|---|---|---|---|---|---|---|---|
| | | | | | | | | 7 Day (N-m) | 60 Day (N-m) | 180 Day (N-m) | 365 Day (N-m) |
| Casing E 20 × 85 LTW | LTW | 16276-7 | PG Only | PG Only | 2.6-3.2 | 1.6-1.9 | 4.2-5.2 | 0.09 | 0.11 | 0.00 | 0.00 |

In comparison to use of the other solutions, the use of the Sol1 or Sol3 cohesion-enhancing solutions demonstrated greater coherency at the one-week (7 day) point, equal or greater coherency at the two-month (60 day) point, greater coherency at the six-month (180 day) point, and greater coherency at the one-year (365 day) point. At the one-year point, the shirred sticks formed with treatment of the other solutions lacked any measurable coherency, while the shirred sticks formed using the Sol1 or Sol3 coherency-enhancing solutions demonstrated nearly as much coherency as at the one-week point. Accordingly, the use of the coherency-enhancing solutions significantly improved both the short-term and long-term coherency of the shirred stick casing article.

While the disclosed compositions, articles, and methods are susceptible to various modifications and alternative forms in implementation thereof, specific embodiments have been shown by way of example in the drawings and have been described in detail herein. However, it should be understood that the present invention is not intended to be limited to the particular forms disclosed. Rather, the present invention encompasses all modifications, combinations, equivalents, variations, and alternatives falling within the scope of the present disclosure as defined by the following appended claims and their legal equivalents.

What is claimed is:

1. A shirred food casing article, comprising:
   a casing material; and
   a coherency-enhancing solution on or in the casing material, the coherency-enhancing solution comprising:
   at least one polysaccharide; and
   a predominantly non-aqueous solvent, the predominantly non-aqueous solvent comprising at least 50 wt. % of the coherency-enhancing solution, the predominantly non-aqueous solvent comprising one or more of propylene glycol, glycerin, and triglyceride;
   the coherency-enhancing solution comprising less than 20 wt. % water.

2. The shirred food casing article of claim 1, wherein the at least one polysaccharide comprises dextrin.

3. The shirred food casing article of claim 1, wherein the predominantly non-aqueous solvent comprises the propylene glycol.

4. The shirred food casing article of claim 3, wherein the coherency-enhancing solution comprises at least 50 wt. % the propylene glycol.

5. The shirred food casing article of claim 1, wherein the casing material comprises nylon.

6. The shirred food casing article of claim 1, wherein the casing material is non-permeable.

7. The shirred food casing article of claim 1, wherein the shirred food casing article comprises at least 140 ft (42.7 m) of a maximum effective length of the casing material.

8. A method for forming a shirred food casing article, the method comprising:
   applying a coherency-enhancing solution to at least one surface of a casing material, the coherency-enhancing solution comprising:
   at least one polysaccharide; and
   a predominantly non-aqueous solvent, the predominantly non-aqueous solvent comprising at least 50 wt. % of the coherency-enhancing solution, the predominantly non-aqueous solvent comprising one or more of propylene glycol, glycerin, and triglyceride;
   the coherency-enhancing solution comprising less than 20 wt. % water; and
   shirring the casing material to form the shirred food casing article comprising the casing material and the coherency-enhancing solution on or in the casing material.

9. The method of claim 8, wherein applying the coherency-enhancing solution to the at least one surface of the casing material comprises applying the coherency-enhancing solution to the at least one surface of the casing during shirring of the casing material.

10. The method of claim 8, wherein applying the coherency-enhancing solution to the at least one surface of the casing material comprises applying the coherency-enhancing solution to the at least one surface of the casing before shirring of the casing material.

11. The method of claim 8, wherein applying the coherency-enhancing solution to the at least one surface of the casing material comprises applying the coherency-enhancing solution to an outer surface of the casing material.

12. The method of claim 8, wherein applying the coherency-enhancing solution to the at least one surface of the casing material comprises applying the coherency-enhancing solution to an inner surface of the casing material.

13. The method of claim 8, wherein applying the coherency-enhancing solution to the at least one surface of the casing material comprises applying the coherency-enhancing solution to both an inner surface and an outer surface of the casing material.

14. The method of claim 13, wherein applying the coherency-enhancing solution to both the inner surface and the outer surface of the casing material comprises applying a different composition of the coherency-enhancing solution to the inner surface than to the outer surface of the casing material.

15. The method of claim 8, wherein shirring the casing material comprises shirring the casing material on a shirring mandrel.

16. The method of claim 15, further comprising removing the shirred food casing article from the shirring mandrel without providing a constraining article to inhibit axial expansion of the casing material.

17. The method of claim 15, further comprising removing the casing material from the shirring mandrel without inserting a supportive structure within a central opening of the shirred food casing article.

18. The method of claim 8, wherein the method does not include axially compressing the casing material during the shirring.

19. The method of claim 8, wherein the method does not include axially compressing the casing material after the shirring.

20. A cohesion-enhancing solution for inclusion on or in a shirred casing material, the cohesion-enhancing solution comprising:
- at least one polysaccharide; and
- a predominantly non-aqueous solvent, the predominantly non-aqueous solvent comprising at least 50 wt. % of the cohesion-enhancing solution, the predominantly non-aqueous solvent comprising one or more of propylene glycol, glycerin, and triglyceride;
- the cohesion-enhancing solution comprising less than 20 wt. % water.

* * * * *

UNITED STATES PATENT AND TRADEMARK OFFICE
CERTIFICATE OF CORRECTION

PATENT NO. : 12,232,502 B2
APPLICATION NO. : 17/218626
DATED : February 25, 2025
INVENTOR(S) : Ann Dinh-Sybeldon, Matthew E. Bachner and Owen J. McGarel It is certified that error appears in the above-identified patent and that said Letters Patent is hereby corrected as shown below:

In the Specification

| | | |
|---|---|---|
| Column 2, | Line 5, | change "after slurring and" to --after shirring and-- |
| Column 3, | Line 55, | change "0.1 g·day$^{-1}$·100 in$^{-2}$·-mmHg$^{-1}$" to --0.1 g·day$^{-1}$·100 in$^{-2}$·mmHg$^{-1}$-- |
| Column 5, | Line 29, | change "12 in/mm (0.51" to --12 in/min (0.51-- |
| Column 5, | Lines 30-31, | change "(*e.g.*, die force" to --(*e.g.*, the force-- |
| Column 5, | Line 40, | change "to ASTN E74-18e01." to --to ASTM E74-18e01.-- |
| Column 8, | Line 4, | change "the slurred stick" to --the shirred stick-- |
| Column 11, | Line 33, | change "Nylon 61/6T" to --Nylon 6I/6T-- |
| Column 11, | Line 35, | change "Nylon 61/6T" to --Nylon 6I/6T-- |

Signed and Sealed this
Twenty-sixth Day of August, 2025

Coke Morgan Stewart
*Acting Director of the United States Patent and Trademark Office*